(12) United States Patent
Solala

(10) Patent No.: US 7,193,995 B1
(45) Date of Patent: Mar. 20, 2007

(54) LICENSE CONTROL AT A GATEWAY SERVER

(75) Inventor: Erkki Solala, Kangasala as (FI)

(73) Assignee: Nokia Corporation, Espoo (FI)

( * ) Notice: Subject to any disclaimer, the term of this patent is extended or adjusted under 35 U.S.C. 154(b) by 881 days.

(21) Appl. No.: 10/019,893

(22) PCT Filed: Jun. 7, 2000

(86) PCT No.: PCT/FI00/00513

§ 371 (c)(1),
(2), (4) Date: Mar. 7, 2002

(87) PCT Pub. No.: WO01/03368

PCT Pub. Date: Jan. 11, 2001

(30) Foreign Application Priority Data

Jun. 30, 1999 (FI) ..................... 991493

(51) Int. Cl.
*H04L 12/28* (2006.01)
(52) U.S. Cl. .................. 370/389; 705/59; 709/228
(58) Field of Classification Search ........... 370/331, 370/412, 397, 401, 395.2, 395.21, 395.52
See application file for complete search history.

(56) References Cited

U.S. PATENT DOCUMENTS 5,485,460 A    1/1996  Schrier et al. ............. 370/94.1
5,673,322 A *  9/1997  Pepe et al. ..................... 705/52
5,915,087 A    6/1999  Hammond et al. .... 395/187.01
6,473,406 B1* 10/2002  Coile et al. ................. 370/248

FOREIGN PATENT DOCUMENTS

EP         0642283 A2    3/1995
WO         WO 99/56431   11/1999

OTHER PUBLICATIONS

Patent Abstracts of Japan, publication No. 10136336 A.

* cited by examiner

*Primary Examiner*—Doris H. To
*Assistant Examiner*—Thien Tran
(74) *Attorney, Agent, or Firm*—Perman & Green, LLP

(57) ABSTRACT

The invention relates to a gateway server for receiving a message from a terminal and comprising a protocol stack (50) for processing the message according to a particular protocol stack. The server further comprises license control means (53) for controlling the access right of the message to enter the server before the message is allowed to pass to the protocol stack (50). The invention also relates to a method and a computer program product for controlling, at a server, access right of a message received from a terminal at the server.

18 Claims, 4 Drawing Sheets

LICENSE CONTROL AT A GATEWAY SERVER

The present invention relates to license control at a gateway server for controlling the right for a message to enter the server. It is particularly suitable for a mobile protocol such as WAP (Wireless Application Protocol) for enabling a mobile terminal to access the Internet via the gateway server.

The term "Internet" is commonly used to describe information, content, which can be accessed using a terminal, typically a PC, connected via a modem to a telecommunications network. The content can be stored at many different sites remote from the accessing computer, although each of the remote sites is also linked to the telecommunications network. The content can be structured using HyperText Mark-up Language (HTML). The Internet is made workable by the specification of a standard communications system which makes use of a number of protocols, such as the Transfer Control Protocol (TCP), the User Datagram Protocol (UDP), and the Internet Protocol (IP), to control the flow of data around the numerous different components of the Internet. TCP and UDP are concerned with the prevention and correction of errors in transmitted Internet data. IP is concerned with the structuring and routing of data. On top of that, other application specific protocols may be provided to manage and manipulate the various kinds of information available via the Internet, for example HTTP to access HTML content, FTP to access files or SMTP to access e-mail.

The Internet is physically constructed from a hierarchy of telecommunication and data communication networks, for example local area networks (LANs), regional telephone networks, and international telephone networks. These networks are connected internally and externally by so-called "routers" which receive data from a source host, or a previous router in a transmission chain, and route it to the destination host or the next router in the transmission chain.

Figure 1:
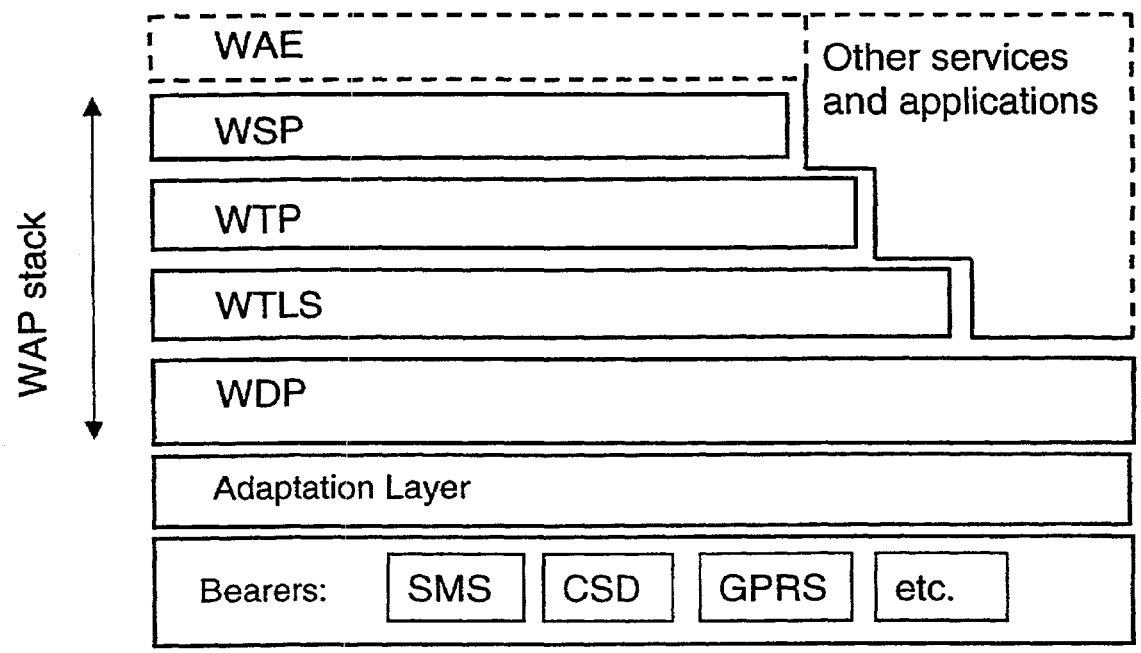

With increased use of mobile cellular telephones, there is a growing demand for so-called mobile Internet access, in which access is made from a portable computer connected to a cellular telephone or from an integrated computer/cellular phone device. Typically, the purpose of such access is to obtain content from the Internet. It has also been proposed to provide Internet access to advanced mobile terminals, so-called communicators and smart phones, by means of the Wireless Application Protocol (WAP), for example. WAP has an architecture in which there is a protocol stack having an application layer (called the Wireless Application Environment or WAE), a session layer (called the Wireless Session Protocol or WSP), a transaction layer (called the Wireless Transaction Protocol or WTP), a security layer (called Wireless Transport Layer Security or WTLS) and a transport layer (called the Wireless Datagram Protocol or WDP) as shown in FIG. 1. Each of the layers of the architecture is accessible by the layers above as well as by other services and applications. These protocols are designed to operate over a variety of different bearer services such as SMS (Short Message Service), CSD (Circuit Switched Data), GPRS (General Packet Radio Service) etc.

Obtaining access to the Internet generally involves having sessions between a terminal, such as a mobile terminal, and a server. A session is a series of interactions between a terminal and a server having a well-defined beginning and end and involving agreed-upon characteristics. Typically, a session involves a peer announcing to another peer a desire to establish a session, both peers negotiating the characteristics of the session, the peers engaging in a variety of transactions and one of the peers ending the session. The characteristics which are negotiated are typically the length of packets to be exchanged, the character sets which can be understood and manipulated and the versions of protocols which are to be used. A transaction is a basic unit of interaction and may include requesting and receiving information, aborting an ongoing session and informing a peer of a situation in an on-going session. All session operations to establish and terminate a session as well as all transactions result in events being generated and received by the peer. There are many event sources (sessions and transactions).

The operations which an application can invoke to generate events are called service primitives. Service primitives represent the logical exchange of information and control between the session layer and other layers. They consist of commands and their respective responses associated with the particular service provided. Invoking a service primitive in a peer on one side of a communication link results in an event being generated in a peer in the other side of the link. Service primitives are present in all communication protocols.

An active session can involve multiple transactions and so can generate multiple events. Depending on the speed at which an application can process events coming from its peer, it can happen that there are more transactions than it can process and so it receives more events than it can process. In this case, the events are queued up and wait to be processed within the context of that session. Events connected or related to the same session generally need to be processed in a specific order. In some protocols, a session can be suspended, in which state no transactions are allowed except a request to resume or to terminate.

In WAP, communication between layers and between entities within the session layer are also accomplished by means of service primitives.

Most transactions are either of the push type or of the pull (request-reply) type. In push type transactions a peer sends information which has not been specifically requested and in pull type transactions, a peer specifically requests to receive information from another peer.

Terminals, such as personal computers, obtain information from the Internet through a server, such as a gateway server. The Internet uses HTTP which is a simple request-reply protocol. Almost the only event is an HTTP request. The operating system of the server runs a number of applications and so creates a number of threads to deal with them, for example proxies and mail servers. The applications use the available threads as they are required. In the case of Internet access by a PC, it is convenient to create a thread in the server dynamically to deal with each request because the requests are independent from each other. Once the request has been processed, the thread has finished its activity and is terminated.

In a communication system comprising a gateway server and a plurality of mobile terminals, establishing a session requires a relatively large amount of bandwidth because a terminal and a server must negotiate many characteristics relevant to the session. Furthermore, information which is unique to a particular opened session may be lost if the session is terminated. This unique information could have been negotiated as a result of transactions. For example, it may be the status of a game. In order to avoid opening and closing sessions on demand and establishing new sessions whenever they are needed, the sessions may be kept open for a long time, even in an inactive state, so that they can be resumed when needed. A session can remain open for days or even weeks until it is closed or until the terminal no longer receives power, for example from a battery. An application in the server will use the operating system thread management service and create a number of threads to manage these sessions.

In WAP typically a gateway server will be the port for allowing a terminal to access the Internet. The gateway server will be provided by e.g. a service provider, and users may access the gateway server by purchasing a license or number of licenses from the service provider. Accordingly, there is a need to implement a solution at the gateway server for controlling access to the gateway server. Equally the gateway server is usually implemented as a computer program which when loaded into a computer works as a gateway server. Thereby the manufacturer of the gateway server, i.e. the maker of the computer program, may sell licenses to the service provider, which limits the number of users that the service provider is able to serve without purchasing additional licenses from the manufacturer. Thus there is a need to implement a solution at the gateway server for controlling number of total licenses in use at the server.

Now a gateway server has been invented where license control is performed on a message entering the gateway server before it is allowed to pass on to the protocol stack, i.e. license control is performed below the protocol stack in the gateway server hierarchy. Identification of the sender of the message is checked to determine access rights. In a WAP gateway or proxy server there is more specifically provided below the WAP stack and above the bearers a bearer gate which performs the license control, and through which all data traffic coming from the bearers passes before going to the protocol stack.

The present invention can be used for controlling access right of a message in both of the above mentioned situations, namely for controlling that the service provider does not exceed the number of licenses it has purchased from the manufacturer of the gateway server and for controlling that a user entity having purchased a number of licenses from the service provider does not exceed that number of licenses.

In a preferred embodiment of the invention datagrams or data packets are received via a particular bearer. This data packet has an address of the sender, also called source address, remote address or client address. Moreover, each data packet has a port number of the sender, also called source port, remote port or client port information. In an embodiment of the present invention both the address and port number of the sender are checked for identifying the sender for license control purposes.

Licenses are calculated on a session basis, i.e. controlling concurrent sessions from the same license holder. There is no limit for number of transactions that are allowed during a session per license, but the license control is about how many sessions are allowed to execute transactions concurrently. In a particular embodiment the sessions will be given a time window during which the license is reserved, and unless there is data traffic within that session within the time window, the license for that session will be released. Next time there is a need for executing transactions within that session, a new license needs to be taken into use.

According to a first aspect of the invention there is provided a server for receiving a message from a terminal and comprising a protocol stack for processing the message according to a particular protocol stack, the server further comprising: license control means for controlling the access right of the message to enter the server before the message is allowed to pass to the protocol stack.

In one particular embodiment, the invention comprises a gateway server serving a plurality of mobile terminals. It may be a WAP gateway. For example, commands, such as WAP requests, may be sent in short messages (generated by SMS) and sent to a WAP/HTTP gateway. The gateway will interpret these as WAP network packets and will perform the necessary HTTP transactions on an origin server. After that it sends back a WAP message on the same bearer, i.e. as an SMS message containing the result.

According to a second aspect of the invention there is provided a method of controlling, at a server, access right of a message received from a terminal at the server, and where the message is processed by a protocol stack, the method comprising:

checking the right of the message to enter the server before the message is allowed to pass to the protocol stack.

According to a third aspect of the invention there is provided a computer program product for controlling, at a server, access right of a message received from a terminal at the server, and where the message is processed by a protocol stack, the computer program product comprising:

computer readable program means for controlling the access right of the message to enter the server before the message is allowed to pass to the protocol stack.

Preferably the invention is implemented as software, which when loaded into a computer will function as a gateway server according to the present invention.

Figure 2:
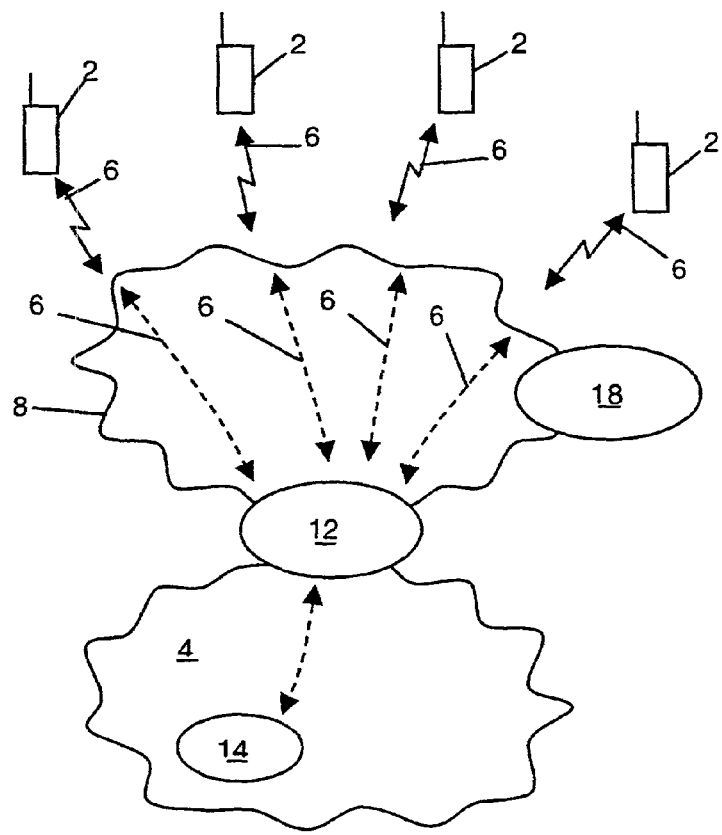
Figure 3:
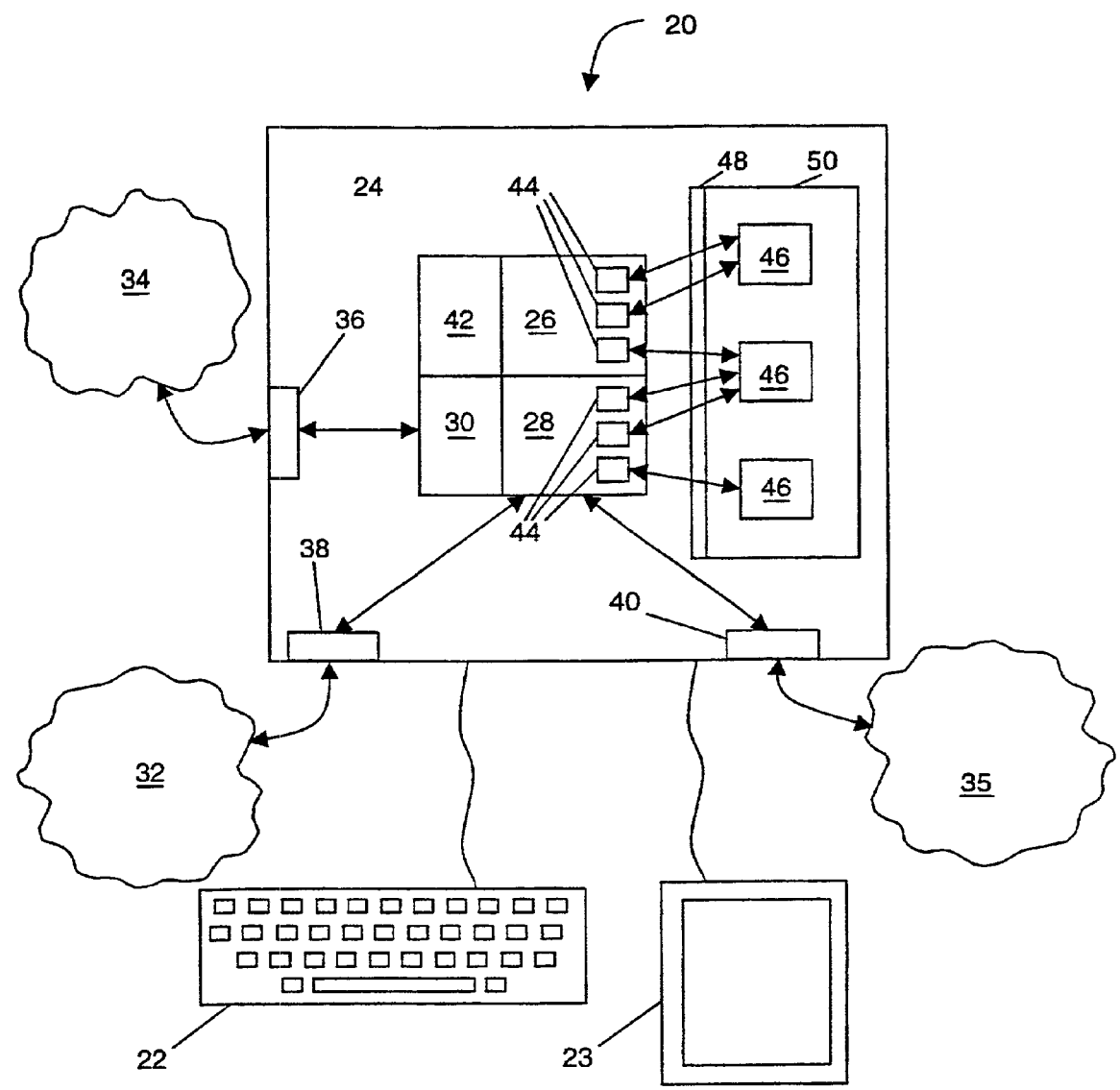
Figure 4:
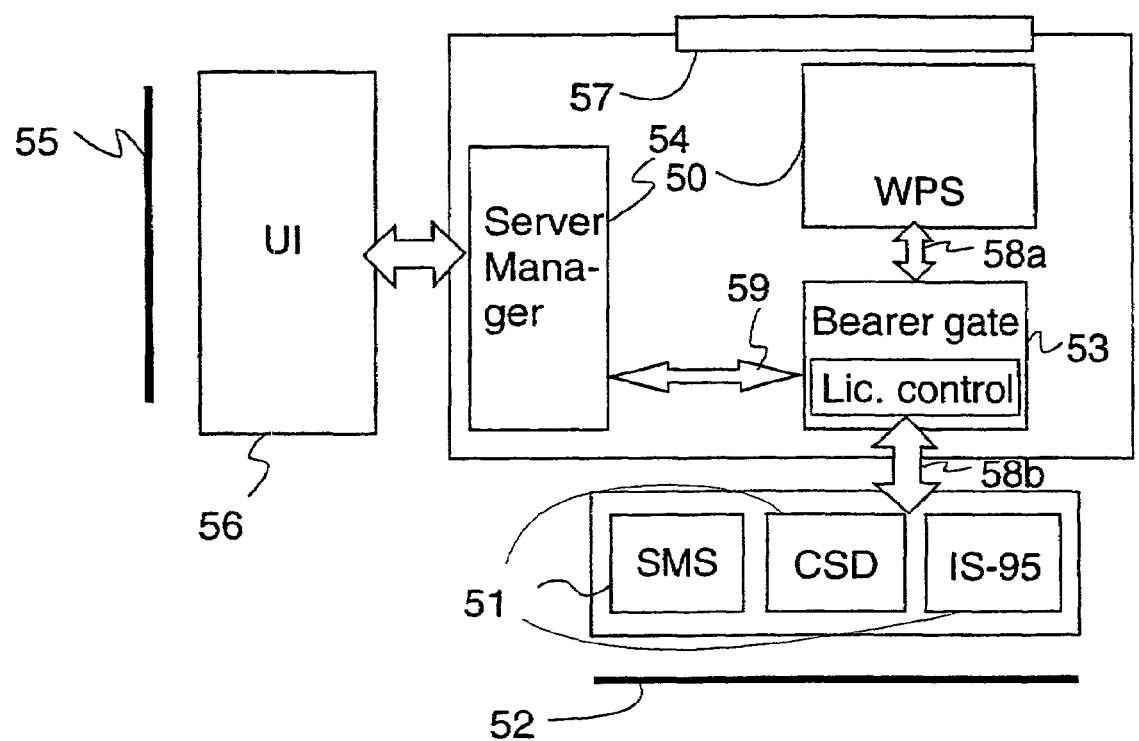
Figure 5:
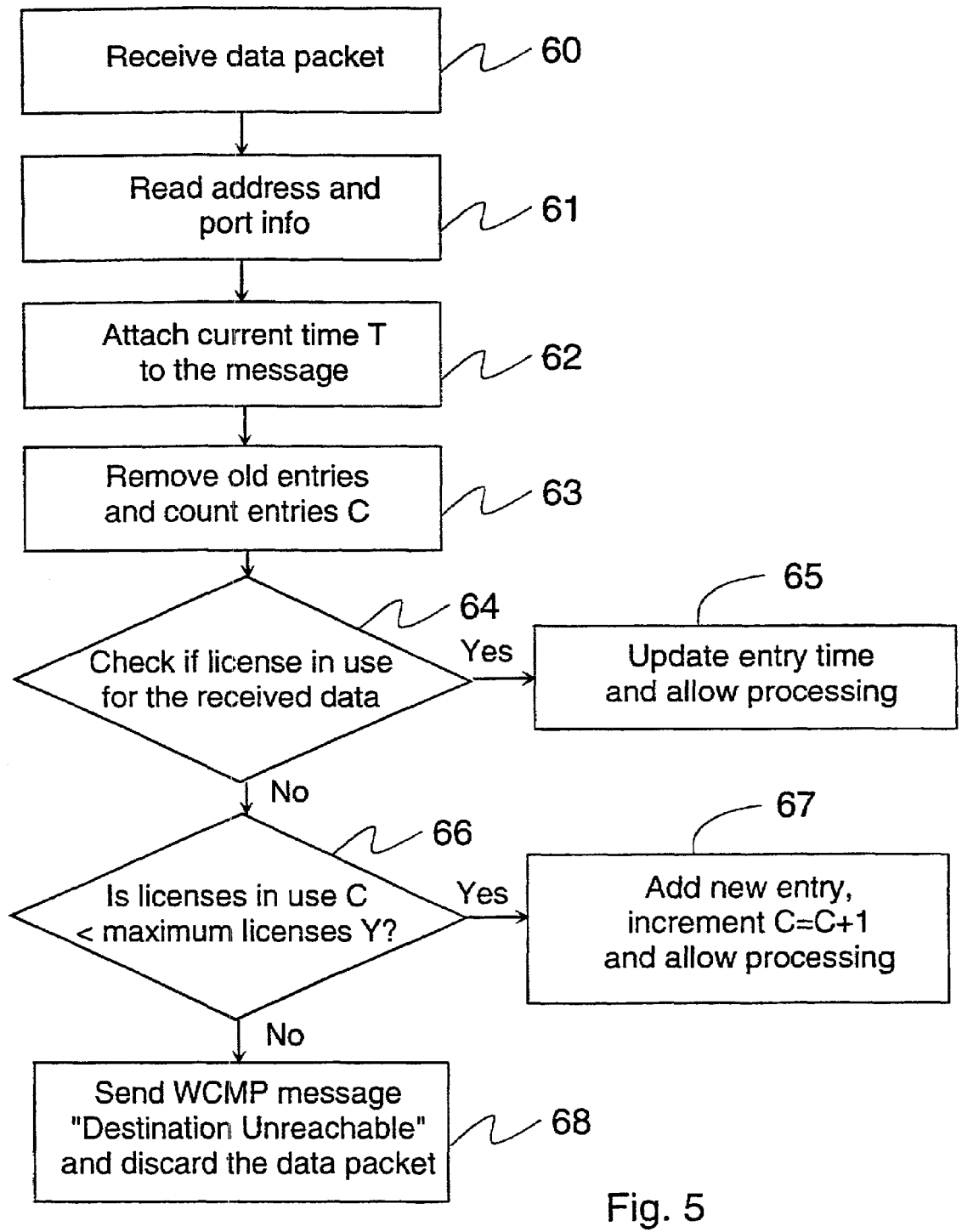

The invention will be discussed below in detail by referring to the enclosed drawings, in which FIG. 1 shows an arrangement of protocol stacks in the Wireless Application Protocol (WAP), FIG. 2 shows a communication system, FIG. 3 shows a gateway server embodied in hardware, FIG. 4 shows a functional block diagram of a gateway server according to the present invention, and FIG. 5 shows steps performed at license control as a flow diagram.

In the following example, communication is described with reference to the Wireless Application Protocol (WAP) mentioned above. It should be noted that the invention is not limited to the use of WAP and other protocols and specifications may be used.

FIG. 2 shows a communication system comprising a plurality of mobile terminals 2 having access to the Internet 4. The mobile terminals transmit signals 6 which are received by and transmitted through a wireless network 8. The wireless network can be a number of different network systems such as GSM, CDMA IS-95, TDMA IS-136, and UMTS, and can use different type of communication within one and the same system, for example SMS, GPRS or HSCSD communication within GSM. Accordingly a number of different bearers can be used for transmitting signals 6. WAP requests 6 received by the network 8 are routed to a proxy or gateway server 12. The server 12 translates WAP requests into HTTP requests and thus allows the mobile terminals 2 to request information from a web server 14 and thus browse the Internet 4. Information obtained from the web server 14 is encoded by the proxy into a suitable format and then transmitted by the wireless network to the mobile terminal 2 which requested it. The response comprises wireless mark-up language (WML) according to WAP. WML is a tag-based display language providing navigational support, data input, hyperlinks, text and image presentation, and forms. It is a browsing language similar to HMTL. The mobile terminal 2 processes and uses the information. If the web server 14 provides content in WAP/

WML format, the server 12 can retrieve such content directly from the web server 14. However, if the web server provides content in WWW format (such as HTML), a filter may be used to translate the content from WWW format to WAP/WML format.

The Wireless Application Protocol is applicable to a number of different systems including GSM-900, GSM-1800, GSM-1900, CDMA IS-95, TDMA IS-136, wide-band IS-95 and third generation systems such as IMT-2000, UMTS and W-CDMA.

Although FIG. 2 shows information being obtained from the Internet, the proxy itself may contain the desired information. For example, the client may retrieve information from the file system of the proxy.

In addition to the web server 14, the mobile terminals may communicate with a wireless telephony application (WTA) server 18.

FIG. 3 shows a gateway server embodied in hardware such as a computer 20. The computer 20 has dynamic memory, processing power and memory to store all of the programs needed to implement the gateway server such as the application program, the protocol stacks and the operating system. The computer 20 comprises a user interface such as a keyboard 22 and a display 23 and a server program 24. The server program 24 has an application program 26 for processing events of the underlying protocol, such as handling a request to retrieve WML from a server, and protocol stacks such as a WAP protocol stack 28 and a HTTP protocol stack 30. The application program 26 controls flow of data, including commands, requests and information, between the computer and various networks including a telephone network 32, the Internet 34 and a data network and circuit switched data networks 35. The application program 26 may further run a program that can be seen on the display 23 and controlled with the keypad 22 (and e.g. a mouse). The computer 20 communicates with the Internet 34 through the HTTP protocol stack 30 and an interface 36. The computer 20 communicates with the telephone network 34 and the data network 35 through interfaces 38 and 40. The server program 24 also comprises a gateway 42 which converts between HTTP and WAP. SMS messaging may be provided via a data connection through appropriate hardware to the operator's network.

Individual threads 44 present in the application program 26 and the WAP protocol stack 28 use processors 46 in the computer 20 to carry out necessary processing tasks. Allocation of threads to processors is provided by threading services 48 present within the operating system 50 of the computer 20.

As shown in FIG. 1 the WAP stack is built on top of so called bearers (which provide datagram services). These bearers can be, for example, SMS or CSD. The bearers have their own protocol and are implemented through protocol stack implementations.

FIG. 4 shows a functional block diagram (embodied in software) of a gateway server hierarchy according to the present invention, at least to the extent for understanding the invention. The gateway server includes a Wireless Protocol Stack (WPS) 50, such as the WAP stack shown in FIG. 1. Below the WPS are the different bearer adapters 51 which access the different bearers through bearer drivers 52.

The function of a bearer adapter has been specified in the Wireless Datagram Protocol specification, i.e. the WDP specification of WAP. There the bearer adapter is called an Adaptation Layer or Tunnel. The Adaptation Layer is the layer of the WDP protocol that maps the WDP protocol functions directly onto a specific bearer. The Adaptation Layer is different for each bearer and deals with the specific capabilities and characteristics of that bearer service. Moreover, at the WAP Gateway or server the Tunnel terminates and passes the WDP packets on to a WAP Proxy/Server via a Tunnelling protocol, which is the interface between the Gateway that supports the bearer service and the WAP Proxy/Server.

The Adaptation Layer or Bearer Adapter is thus a component that connects the WAP Server to the wireless network. To support a number of different bearers the gateway server will thus need to have a number of different bearer adapters 51.

All data from a WAP terminal comes to the gateway server via a bearer represented in the figure by bearer drivers 52 and bearer adapters 51. From the bearer adapter the data enters the WAP stack 50, which can include all or only some of the protocol layers shown in FIG. 1. According to the present invention it has been realised to perform license control directly from the data entering the gateway before it enters the protocol stack 50. In order to do this there is provided functionally between the WPS 50 and the bearer adapters 51 a bearer gate 53, through which all datagram traffic between a bearer adapter and the WPS passes. Accordingly the bearer gate 53 performs the license control, i.e. checks if every incoming data packet has access rights or not, whereby the packet is either allowed to pass to the protocol stack for processing or is discarded.

The WDP specification specifies a service primitive T-DUnitdata used to transmit data. It comprises amongst other the following parameters:

1) The Source Address, which is the address of the sender and is the unique address of the device making a request to the WDP layer. The source address may be an MSISDN number (Mobile Station ISDN number), IP address (given as numbers e.g. 153.226.0.56 or as symbols a.g. mycomputer.company.subsidiary.com), X.25 address or other identifier. Thereby the length of the Source Address parameter may vary according to what the source is.

2) The Source Port, which is the application address or port number associated with the source address of the requesting communication instance. The port number of the sender is a 16-bit number.

3) The User Data, which is the user data carried by the WDP protocol. The unit of data submitted to or received from the WDP layer is also referred to as the Service Data Unit. This is the complete unit (message, packet, package) of data which the higher layer (at the sender) has submitted to the WDP layer for transmission. The WDP layer will transmit the Service Data Unit and deliver it to its destination without any manipulation of its content.

The Source Address and Source Port parameters are part of a header portion of a WAP message and the User Data is the actual payload or data of the message.

For license control the bearer gate will read both the Source Address and Source Port information in every data packet that is received at the bearer gate 53 via the bearer adapters 51. Each combination of a client address (Source Address) and a client port (Source Port) makes up a concurrent session and thereby requires one license. This means that the same terminal can consume more than one license, for example if the user is concurrently using two different applications at the terminal by accessing a service via the gateway server (e.g. a banking application and a calendar application). Usage of also the client port number (Source Port) for identifying the sender is necessary to prevent someone from using a proxy machine to circumvent the license check (with UDP bearer), in which case several terminals could go via the proxy machine to the gateway, whereby the Source Address would always be the same. However, the Source Port information in the data packet would still be different.

The licenses are calculated on a session basis, i.e. controlling concurrent sessions from the same license source. There is no limit for number of transactions, but the license control is about how many sessions are allowed to execute transactions concurrently. Preferably in an embodiment of the present a fixed size time window has been provided during a session needs a license to execute transactions. The time window may be for example 10 minutes. This means that when a session is established one license is reserved (which is done for every combination of Source Address and Source Port). If no data arrives to the gateway server over that session during that time window, i.e. during 10 minutes, the license is released. Next time that session wants to execute a transaction, a new license is needed, i.e. that data in that session is allowed to pass only if there still is a free license for that license holder.

The idea of the time window in the licensing check is that gateway server accepts during the last 10 minutes data packets only from Y different concurrent sessions. If a data packet from a concurrent session Y+1 is received, Wireless Control Message Protocol (WCMP) message 'Destination Unreachable (address unreachable)' is sent to the client (i.e to the WAP terminal).

The maximum number of the concurrent sessions, Y, is determined by checking the contents of a license storage file (that is stored in a server computer in a normal manner) when the server is started. The license storage file contains encrypted license strings. Each license string allows a certain number concurrent sessions, e.g. 5/10/30/100 or 1000 additional concurrent sessions.

The steps performed at the bearer gate for checking the access rights of a data packet is described in following in relation to FIG. 5. At step 60 a data packet is received at the bearer gate via a bearer adapter. At step 61 the address and port number of the sender is read from the data packet. The bearer gate handles the remote address (Source Address) as unformatted binary data undependent of whether it is an MSISDN, IP address, X.25 address or other identifier. At step 62 the current time T is attached to the message. For this purpose the server keeps a clock as is normal for computers. Next, at step 63 a check is being made from a list or file of already reserved licenses to see if any reservation or entry is older than the allowed time window, which in this example is 10 minutes. If such an entry is found, the entry is removed from the list or file and the license is freed. Also at step the number of entries in use C, i.e. the number of the licenses in use, is counted. At step 64 a check is made to see if a license already exists for the session in which the data packet was received (i.e if less than 10 minutes has passed since the last transaction in that session). If 'yes', the time in the entry is updated in the entry file and processing of the data packet is allowed, whereby the data packet is allowed to pass to the protocol stack (step 65). If the answer to the check at step 64 is 'no', the question is about a new concurrent session, in which case we go to step 66.

In step 66 it is checked whether the number of licenses C in use by the particular licensee is less than the number of licenses Y that the licensee has purchased. If 'yes', goto step 67 where a new license is taken into use, i.e. a new entry is marked to the entry list, C is incremented by one and processing of the message is allowed, whereby the data packet is allowed to pass to the protocol stack. If the answer to step 66 is 'no', whereby the number of licenses C in use by the particular licensee is equal to (or more which it shouldn't be) than the number of licenses Y that the licensee has purchased, a WCMP message (Wireless Control Message Protocol) with the contents "Destination Unreachable" is sent by the bearer gate to the client terminal, and the data packet is discarded (step 68). Relating to step 66, the maximum number of concurrent sessions, i.e. the number of licenses that the license holder has purchased, Y, is determined by checking the contents of the license storage list (e.g. a separete file) when the server is started. The license storage file contains encrypted license strings. Each license string allows e.g. 5/10/30/100 or 1000 additional concurrent sessions.

If it is assumed that all data packets have come from a known and valid client address, then the above explained steps are sufficient for performing the license control. This can be a good approach for the purposes of controlling that the service provider does not exceed the number of licenses purchased from the manufacturer of the gateway server. However, a service provider might want to restrict access to messages coming only from certain predetermined terminals. For that purpose a separate check might be made by keeping at the gateway server a list (or separate file) of allowed addresses and port numbers in general and related to a particular license, whereby if the address and port number do not correspond to any allowed license then the message is discarded and an error message is returned. That check can be done fully separately from the license control check of FIG. 5 is performed of after step 61 in FIG. 5.

Returning to FIG. 4 the bearer gate 53 has a link to a server manager 54, which controls server operation. The server manager 54 gets control commands from the administrator 55, who is allowed to control server operation with a user interface 56, such as the keypad 22 and display 23 shown in FIG. 3. The connection to Internet, such as to a web server is via interface 57.

Between the bearer gate 53 and WPS 50 there is an interface 58a, which is an interface to send and receive WDP datagrams and to retrieve information about the Bearer adapter 51. Further the datagrams are transferred between the bearer gate and the bearer adapter over interface 58b. There is further an interface 59 between the server manager 54 and bearer gate 53 for controlling and configuring the operation of the server and bearer gate 53. Via the user interface 56 the number of licenses purchased or held by a licensee can be changed by the administrator 55.

The different operations and functional blocks shown in FIG. 4 are preferably implemented as software blocks, which are run by processor 46 by calling threads 44 in the application program 26 and protocol stack 28.

The present invention discloses a method by which license control can be handled in a simple manner by performing it below the protocol stack (in view of the server hierarchy). In a WAP gateway server any requirement of using many separate license systems for all combinations of the WAP protocol are avoided by the present invention. A license control system could also be implemented above or within the WAP stack, but would lead to separate license control systems for different protocol combinations. The remote client, i.e. the terminal can make a connection to the WAP server using any of the layers or using many combinations of the protocols. For example, looking at FIG. 1, protocol combinations WDP+WTLS (for services that only require datagram transport with security), WDP+WTP (for applications that only require transaction services without security), WDP+WTP+WSP (for applications that do not require security, but otherwise normal WAP sessions), WDP+WTLS+WTP (for applications that only require transaction services with security) and WDP+WTLS+WTP+WSP (full WAP stack) are all possible and they would all need own licensing counting system, if implemented above the stack. If license control would be implemented above or within the WAP stack, also the problem that not all protocols do use sessions at all, would arise and would need to be solved. For example implementing a licensing system that limits the maximum number of concurrent WSP sessions is easy, but there is also connectionlesss WSP protocol that does not use sessions at all. The present invention, by checking the remote address and remote port information below the protocol stack in every data packet solves this problem in a general way.

The invention can be implemented as software, which when loaded into a computer will function as a gateway server according to the present invention. The functionality of the license control according to the invention can be programmed e.g. in the C or Java programming language, or any other programming language.

This paper presents the implementation and embodiments of the invention with the help of examples. It is obvious to a person skilled in the art, that the invention is not restricted to details of the embodiments presented above, and that the invention can be implemented in another embodiment without deviating from the characteristics of the invention. For example, although the foregoing is a related to mobile terminals browsing the Internet or a WAP proxy, it is to be understood that the communication may be of different types including sending and receiving information, conducting transactions such as financial transactions sending and receiving electronic mail or messages. The range of activities includes accessing services, for example weather reports, news, stock prices, flight schedules, downloading ringing tones, banking services including information provision and payments. It may occur in communications environments other than the Internet and may also be used with other protocol stacks than WAP. Thus, the presented embodiments should be considered illustrative, but not restricting. Hence, the possibilities of implementing and using the invention are only restricted by the enclosed patent claims. Consequently, the various options of implementing the invention as determined by the claims, including the equivalent implementations, also belong to the scope of the present invention.

The invention claimed is:

1. A method of controlling, at a server, access right of a message received from a terminal at the server, and where the message is processed by a protocol stack, and where the message is a data packet comprising:
   a sender address specifying the address of the terminal,
   a port number specifying the application address of the instance sending the message at the terminal, and
   user data including the contents of the message,
and the method comprising:
   checking the right of the message to enter the server before the message is allowed to pass to the protocol stack establishing a session between the server and the terminal and for receiving the data packet within the session, and the checking of the right of the message to enter the server comprises:
   storing a number of access right licenses purchased by a licensee, and reserving a license of the licensee if the data packet arrived in a new concurrent session relating to the licensee,
   controlling that the number of reserved licenses does not exceed the number of purchased access right licenses,
   reserving a license for the session as a response to having determined existence of access right, and
   monitoring the time passed since the last data packet arrived in one session, and releasing the license for the session where a predetermined time has passed since the last data packet arrived in the session.

2. A method according to claim 1, wherein the method further comprises
   reading both the sender address and the port number from the data packet for identifying the terminal.

3. A method according to claim 2, wherein the method further comprises:
   reserving a license for each different combination of sender address and port number found in a data packet.

4. A method according to claim 1, wherein the method further comprises:
   communicating messages with a particular wireless network and adapting messages received from the wireless network for the protocol stack, and after the adaptation checking the access right.

5. A method according to claim 1, wherein the method further comprises:
   passing the message to the protocol stack in response to determining allowed access, and
   discarding the message in response to determining denied access.

6. A method according to claim 5, wherein the method further comprises:
   returning an error message to the terminal in response to a discarded message.

7. A method according to claim 1, wherein where the license has been released for a particular session and a data packet again arrives in that session, performing the access right checking for the newly received data packet and reserving a new license upon allowed access.

8. A method according to claim 1, wherein where a data packet arrives before said predetermined time has passed, performing the access right checking for the newly received data packet, and allowing access on basis of the already reserved license without reserving a new license.

9. A method according to claim 1, wherein the terminals comprise mobile terminals.

10. A method according to claim 9, wherein the mobile terminals comprise cellular telephones supporting the Wireless Application Protocol.

11. A server for receiving a message from a terminal and comprising a protocol stack for processing the message according to a particular protocol stack,
   wherein the message is a data packet comprising:
      a sender address specifying the address of the terminal,
      a port number specifying the application address of the instance sending the message at the terminal, and
      user data including the contents of the message, and the server further comprising:
         license control means for controlling the access right of the message to enter the server before the message is allowed to pass to the protocol stack,
         connection means for establishing a session between the server and the terminal and for receiving the data packet within the session,
         storage means for storing a number of access right licenses purchased by a licensee,
         means for reserving a license of the licensee for each data packet arriving in a new concurrent session relating to the licensee, and means for controlling that the number of reserved licenses does not exceed the number of purchased access right licenses, wherein the server further comprises means for reading both the sender address and the port number from the data packet for identifying the terminal, reservation means for reserving a license for the session as a response to the license control means having determined existance of access right, and timing means for monitoring the time passed since the last data packet arrived in one session, and releasing the license for the session where a predetermined time has passed since the last data packet arrived in the session.

12. A server according to claim 11, wherein the server further comprises a bearer adapter for communicating messages with a particular wireless network and for adapting messages received from the wireless network for the protocol stack, and wherein the license control means have been placed functionally below the protocol stack and above the bearer adapter in the server hierarchy.

13. A server according to claim 11, wherein the server further comprises:

means for reserving a license for each different combination of sender address and port number found in a data packet.

14. A server according to claim 11, wherein the server further comprises means for passing the message to the protocol stack in response to determining allowed access and for discarding the message in response to determining denied access.

15. A server according to claim 14, wherein the server further comprises means for returning an error message to the terminal in response to a discarded message.

16. A server according to claim 11, wherein the server comprises a gateway server serving a plurality of mobile terminals.

17. A server according to claim 16, wherein the server comprises a Wireless Application Protocol, WAP, gateway.

18. A computer program product executable and embodied in a computer readable medium for controlling, at a server, access right of a message received from a terminal at the server, where the message is processed by a protocol stack and wherein the message is a data packet comprising:

a sender address specifying the address of the terminal, a port number specifying the application address of the instance sending the message at the terminal, and user data including the contents of the message, and the computer program product comprising:

computer readable program means for controlling the access right of the message to enter the server before the message is allowed to pass to the protocol stack, wherein the computer program product further comprises:

computer readable program means for causing the server to establish a session between the server and the terminal and for receiving the data packet within the session, computer readable program means for causing the server to store a number of access right licenses purchased by a licensee, and computer readable program means for causing the server to reserve a license of the licensee for each data packet arriving in a new concurrent session relating to the licensee, computer readable program means for causing the server to control that the number of reserved licenses does not exceed the number of purchased access right licenses;

computer readable program means for reserving a license for the session as a response to having determined existance of access right, and computer readable program means for monitoring the time passed since the last data packet arrived in one session, and releasing the license for the session where a predetermined time has passed since the last data packet arrived in the session.

* * * * *